US005565711A

United States Patent [19]
Hagiwara

[11] Patent Number: 5,565,711
[45] Date of Patent: Oct. 15, 1996

[54] DRIVE ENERGY CONTROL APPARATUS FOR AN ELECTRIC VEHICLE

[75] Inventor: Keizo Hagiwara, Tokyo, Japan

[73] Assignee: Kabushiki Kaisha Toshiba, Kawasaki, Japan

[21] Appl. No.: 351,205

[22] Filed: Nov. 30, 1994

[30]  Foreign Application Priority Data

Dec. 15, 1993  [JP]  Japan .................................. 5-315356

[51] Int. Cl.⁶ ................................................. B60K 28/14
[52] U.S. Cl. ........................ 307/10.1; 180/282; 429/150
[58] Field of Search ................................. 307/9, 1, 10.1, 307/10.7, 121, 141, 141.4; 340/669, 436, 438, 440; 280/734, 735; 180/271, 282, 279, 283, 284; 320/18; 429/150; 200/61.45 R

[56]     References Cited

U.S. PATENT DOCUMENTS 3,772,643  11/1973  Dodd et al. ..................... 200/61.45 R
4,861,684   8/1989  Law .................................... 429/150
5,238,083   8/1993  Horie et al. ................... 200/61.45 R
5,389,824   2/1995  Moroto et al. ....................... 307/10.1

Primary Examiner—William M. Shoop, Jr.
Assistant Examiner—Richard T. Elms
Attorney, Agent, or Firm—Oblon, Spivak, McClelland, Maier & Neustadt, P.C.

[57]      ABSTRACT

A drive energy control apparatus for a battery drive electric vehicle which includes a large size main switch provided between a battery power source and a load driver of the vehicle for cutting off a direct heavy current from the battery power source in an emergency. The apparatus further includes a plurality of small size subsidiary switches provided between selected ones of the battery elements for cutting off the coupling of the battery elements at a predetermined time delay after the direct heavy current from the battery power source cut off.

8 Claims, 3 Drawing Sheets

DRIVE ENERGY CONTROL APPARATUS FOR AN ELECTRIC VEHICLE

BACKGROUND OF THE INVENTION

1. Field of the Invention

This invention relates to an apparatus and a method for a drive energy source for an electric vehicle.

In particular, this invention relates to a drive energy source for an electric vehicle which includes means for detections an emergency condition of the vehicle in order to avoid the damages due to the high voltages of the battery source.

2. Discussion of the Background Art

An electric vehicle needs to have a high voltage source for driving a load of the vehicle sufficiently.

In order to get a sufficient drive energy, the energy source of the electric vehicle uses a high voltage battery apparatus in which a plurality of battery elements are connected in series.

A conventional petrol engine car uses an electric power source of a relatively low voltage, like 12 or 24 volts. On the other hand, an energy source for an electric vehicle needs much higher voltage of several hundreds voltage, like 200 or 400 volts.

Such an energy source of a high voltage and of a heavy current is very dangerous and there are some possibility of occurrence of a car fire or human damages caused by sparks or an electric shock due to the short circuit of the high voltage source.

For preventing such severe damages, the battery source of an electric vehicle is usually covered by insulating protection cover means in order to protect a person from an electric shock or a car fire due to a high voltage spark of the electric energy source.

During a normal operating condition, such protection cover means can keep a person or a car itself in safety.

However, once the protection cover means has broken in an emergency, like a car accident or a car crash, the energy apparatus becomes very dangerous one.

When the protection cover has broken and a conductive part or conductive wires are exposed during an emergency condition, the battery energy source again turns to a dangerous weapon for giving a person an electric shock or a car fire.

SUMMARY OF THE INVENTION

Accordingly, it is an object of this invention to provide a safe and compact drive apparatus and a method of a drive energy source for an electric vehicle.

It is another object of this invention to provide a safe drive energy source for an electric vehicle that keeps a person in safety even in an emergency condition.

It is still another object of this invention to provide a drive energy source for an electric vehicle which includes an emergency detecting means for preventing occurrence of dangerous damages.

It is still further object of this invention to provide a drive energy source for an electric vehicle that includes means for disconnecting the serial connection of a plurality of battery elements into a selected small group by using small size subsidiary switches.

The drive energy control apparatus for an electric vehicle of the invention comprises an electric power source means for providing a direct heavy current to a drive motor of the vehicle that includes a plurality of batteries and a plurality of subsidiary switch means for coupling the selected numbers of the batteries in series and a main switch means for cutting off the direct heavy current from the electric power source means in case of emergency of the vehicle.

The drive energy control apparatus further includes an emergency detecting means for detecting an abnormal state of the vehicle in accordance with an abnormal acceleration and/or inclination of the vehicle and supplying an emergency cut off signal to the main switch means and a delay circuit means for providing a delayed cutting off signal to the subsidiary switch means at a predetermined time delay after the main switch means cutting off the power source means for eliminating electrical accidents due to the batteries.

THE DETAIL EXPLANATION OF THE PREFERABLE EMBODIMENT OF THE INVENTION

Now referring to figures, a preferable embodiment of this invention is explained.

Figure 1:
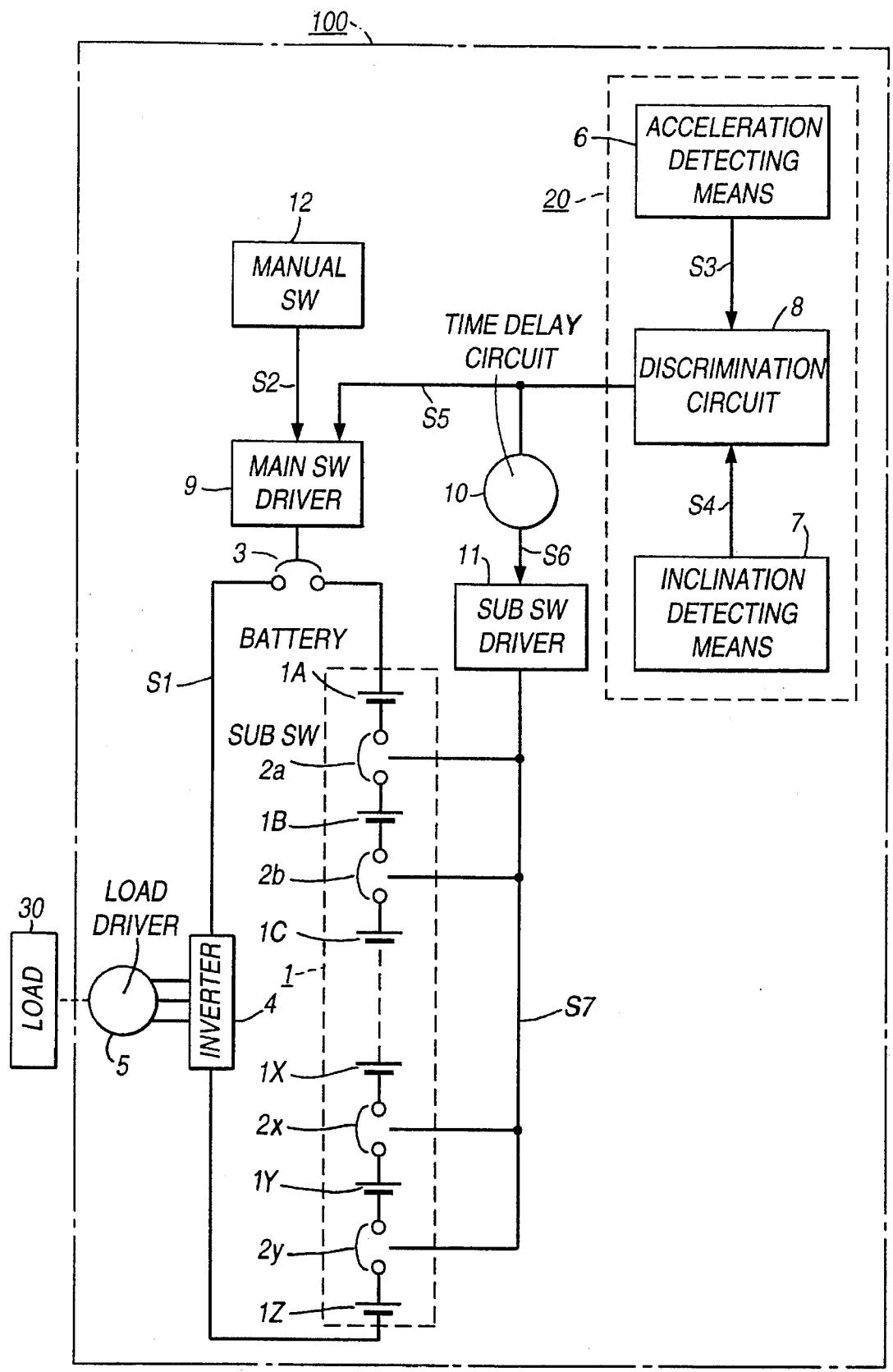
FIG. 1 shows a schematic diagram of the one embodiment of the drive energy control apparatus for an electric vehicle of the invention.

FIG. 1 shows a schematic diagram of an embodiment of the drive energy control apparatus for an electric vehicle of this invention.

In this figure, a drive energy apparatus 100 for an electric vehicle comprises a high voltage power battery apparatus 1 that includes a plurality of battery element 1A, 1B, 1C,—1X, 1Y and 1Z and subsidiary switch means 2a, 2b,—2x, each interposes between the adjacent two battery elements.

The battery elements are coupled in serial through the subsidiary switch means for obtaining a predetermined high voltage.

In this figure, the same number of subsidiary switch means are provided for the respective battery elements in order to connect the serial coupling of the battery elements into one piece. It is, of course, possible to provide the selected number of subsidiary switch means for the battery elements. For example, each subsidiary switch can be provided for every selected two or three battery elements as far as a human safety can be maintain.

The drive energy apparatus further includes a main switch means 3 and an inventor means 4 which are coupled to the battery apparatus 1 in serial.

The main switch means 3 is used for turning on and off the battery apparatus 1 as a whole. In order to turn on and off an electric energy power source of a high voltage and a heavy current, the main switch means must be of a high power specification. That is, the main switch means needs to be a large size switch.

Figure 4:
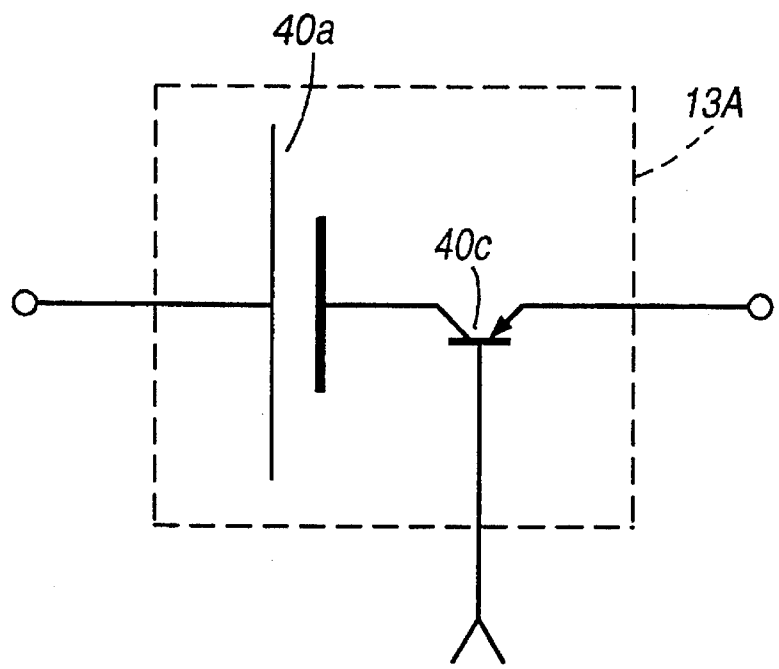

Since the subsidiary switch means operates after the main switch means cutting off the high voltage circuit of the battery apparatus, the specification for the subsidiary switch means is not so severe in comparison to the one for the main switch means. This is, a small size transistor switch, such as shown in FIG. 4, can use as the subsidiary switch.

The inverter means 4 is coupled to a load driver 5, for example, a generator motor which drives a load 30, like a plurality of wheels.

The drive energy control apparatus for an electric vehicle of the invention further includes an emergency detecting means 20. The detecting means 20 includes an acceleration detecting means 6, an inclination detecting means 7 and a discrimination circuit means 8.

The acceleration detecting means 6 detects an abnormal acceleration speed that exceeds a predetermined normal condition speed of the electric vehicle.

When the acceleration detecting means 6 detects an acceleration speed which exceeds over the preset value of the normal conditioned acceleration, it provides a first warning signal S3 to the discrimination circuit means 8.

The inclination detecting means 7 detects a tilt or an inclination angle of a body of the electric vehicle. When the body inclines over a preset inclination angle, the inclination detecting means 7 provides a second warning signal S4 to the discrimination circuit means 8.

Both of the output terminals of the acceleration detecting means 6 and the inclination detecting means 7 are respectively coupled to the respective input terminals of a discrimination circuit means 8.

The output terminal of the discrimination circuit means 8 is coupled to a main switch driving circuit means 9. Further the output signal of the discrimination circuit means 8 is simultaneously supplied to a time delay circuit means 10.

When either or both warning signals S3 and S4 are delivered to the discrimination circuit means 8, a main switch turning-off signal S5 is supplied to the main switch driving means 9.

The main switch turning-off signal S5 from the discrimination circuit means 8 is simultaneously supplied to a time delay circuit means 10.

By receiving the main switch turning off signal S5, the time delay circuit means 10 begins to time count for a predetermined period. After counting, the time delay circuit means 10 provides a subsidiary switch drive signal S6 to an input terminal of a subsidiary switch driving means 11.

Then the subswitch driving means 11 supplies a subswitch turning off signal S7 to the respective subswitch means 2a, 2b,—2x and 2y for disconnecting the serial coupling of the battery elements into a discrete one.

The main switch means 3 can be manually operated through a main switch driving means 9 and a manual start switch means 12.

In a starting time of the operation, an engine key makes a manual switch means active and a start signal S2 is supplied to a main switch driver means 9.

The main switch drive means 9 turns the main switch 3 on in order to supply a high voltage from the battery apparatus 1 to the load driver 5 through the inventor circuit 4.

For supplying an electric energy to the acceleration detecting means 6, the inclination detecting means 7, the discrimination circuit means 8, the main switch driving means 9, the time delay circuit means 10 and the subsidiary switch driving means 11, an independent electric source (not shown in figures,) is provided in the vehicle.

Following is an explanation of the operation of the structure of the drive energy apparatus.

During a normal operation, all of the subsidiary switch means 2a, 2b,—2x and 2y are turning on and the electric vehicle can be driven when the main switch means 3 is connected by turning the manual start switch means 12 on.

By turning the manual start switch means 12 on, the main switch driving circuit means 9 makes the main switch means 3 turn on and the drive energy of a high voltages of the battery apparatus 1 is supplied to the load driver 5 to drive the rotating loads 30.

In an emergency condition, such as a car accident or a car crash, the body of the electric vehicle receives an abnormal impact or a rolling power.

When the body of the electric vehicle receives such abnormal power that exceeds the preset values of the normal conditions, the acceleration detecting means 6 and the inclination detecting means 7 provides a first warning signal S3 and the second warning signal S4, respectively.

The first and second warning signals S3 and S4 are respectively supplied to the discrimination circuit means 8.

When the discrimination circuit means 8 received either or both of the first and second warning signals S3 and S4, the discrimination circuit means 8 detects that the vehicle is in an emergency condition. Then the discrimination circuit means 8 supplies a main switch drive control signal S5 both to the main switch drive circuit 9 and to the time delay circuit 10 simultaneously.

By providing the control signal S5, the main switch drive circuit 9 turns the main switch means 3 off immediately to cut off the energy supply from the battery apparatus to the inventor means 4.

Accordingly, the load driver 5 and the load 30 are compulsorily stopped its operation.

Coincidentally, the time delay circuit 10 begins to count a during a preset time period.

After counting up to the preset time period, the time delay circuit means 10 delivers a subsidiary switch drive signal S6 to the subswitch driving means 11.

Then the subswitch driving means 11 provides a subsidiary switch turning off signal S7 to the respective subsidiary switch means 2a, 2b,—,2x and Ey. By turning the subswitch means off, the serial coupling of the plurality of battery elements is disconnected into a discrete one.

Consequently, even if an insulating protection cover means for the high power battery apparatus has been broken and conductive parts are exposed due to the shock of the car accident, it can still keep a person in safety.

An electric spark and a caused car fire due to an electric short circuit are also prevented from its occurrence.

Accordingly, a high degree of the safety of the battery apparatus for an electric vehicle can be achieved.

In the embodiment in FIG. 1, a plurality of subsidiary switch means are provided to the respective adjacent two battery elements. It is, of course, possible to provide the subsidiary switch means to a selected number of coupling of the battery elements as far as the safety can maintain.

Figure 2:
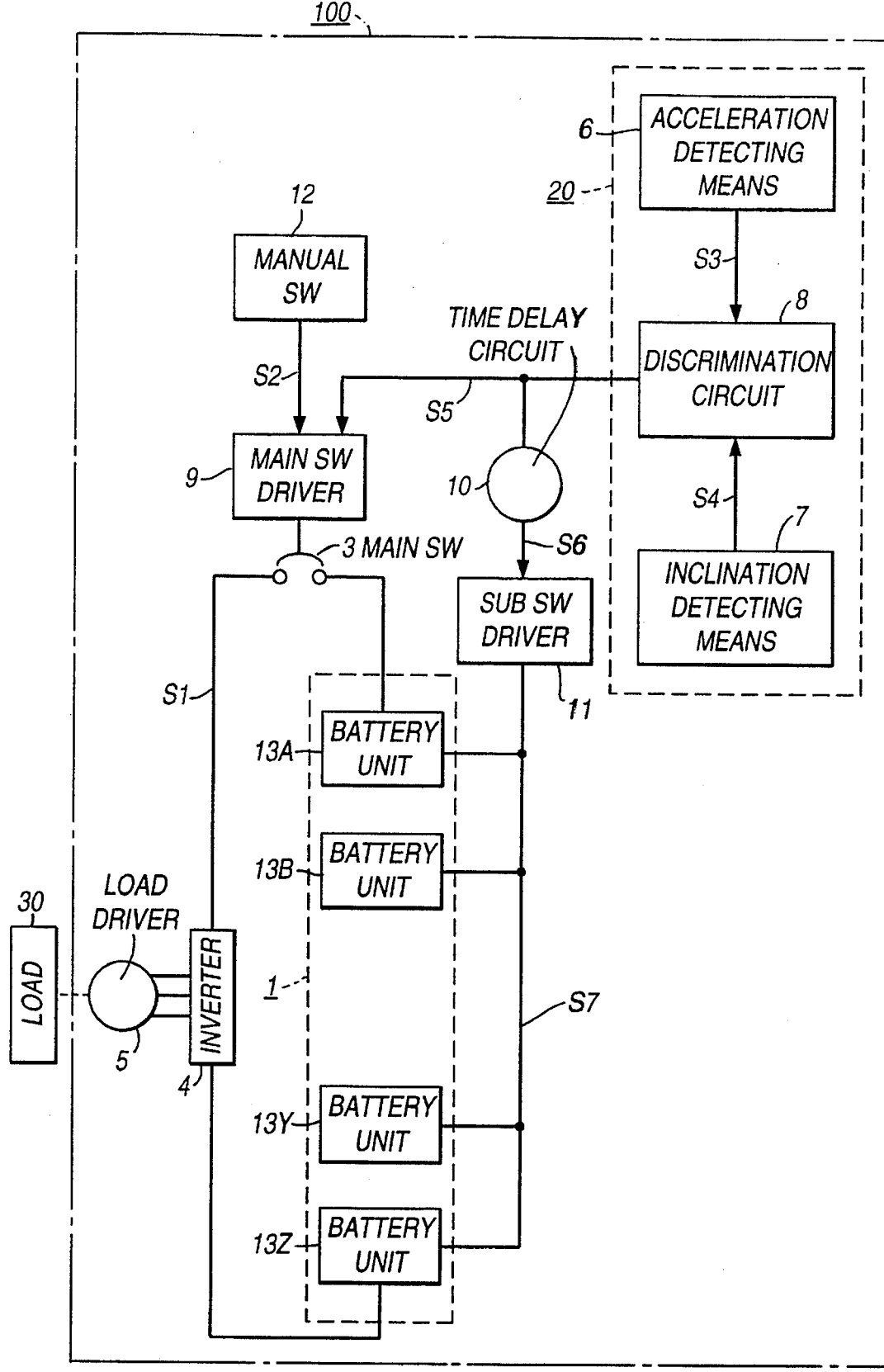
FIG. 2 depicts a schematic diagram of another embodiment of the drive energy control apparatus for an electric vehicle of the invention.

FIG. 2 depicts another embodiment of the invention.

Figure 3:
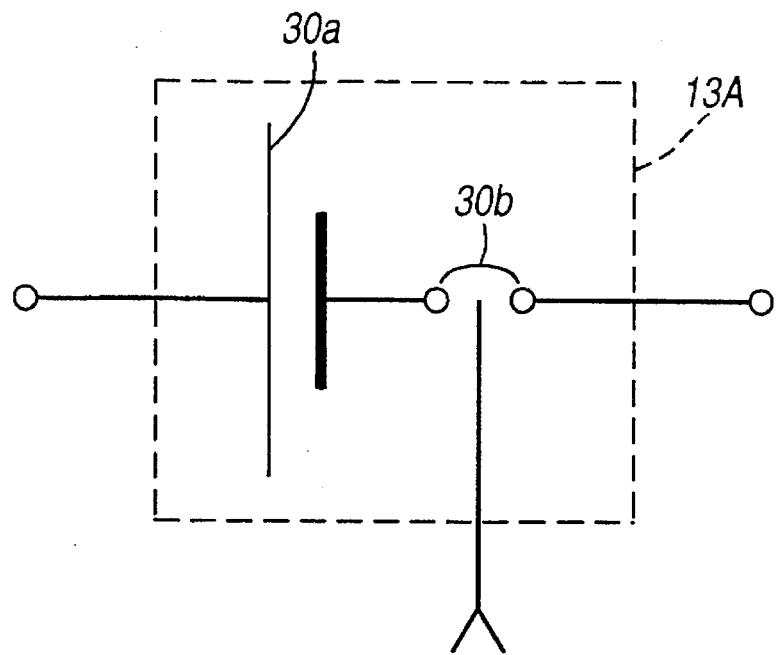
FIGS. 3 and 4 show an embodiment of the battery unit which includes a built-in subsidiary switch means for applying to the drive energy control apparatus for an electric vehicle of the invention.

In this embodiment, a high power battery apparatus 1 includes plural battery unit 13A, 13B—,13Y and 13Z, each includes a built-in subswich contact means as shown in FIGS. 3 or 4.

Another features of the drive energy apparatus are substantially the same to FIG. 1 as affixed the same number in FIG. 1.

In this embodiment, a drive energy apparatus 100 for an electric vehicle comprises a high power battery apparatus 1 of plural battery unit 13A, 13B,—, 13Y and 13Z are coupled in serial.

Each of the battery units includes a built-in switch contact means as shown in FIGS. 3 or 4.

The drive energy apparatus 100 includes a main switch means 3 and an inverter means 4 that are coupled to the battery apparatus 1 in serial, and that comprise a high electric energy power source for an electric vehicle.

The main switch means 3 turns on and off the battery apparatus 1 mechanically as a whole. To turn on and off an electric energy power source of a high voltage, the main switch means is composed of under a high power specification.

The inventor means 4 is coupled to a load driver of a generator motor 5 that drives rotating loads 30, for example, of a plurality of wheels The drive energy apparatus 100 for an electric vehicle further includes an acceleration detecting means 6 and an inclination detecting means 7.

The acceleration detecting means detects a receiving acceleration speed in a body of an electric vehicle.

When the acceleration detecting means 6 detects an abnormal acceleration speed that exceeds the preset value of for a normal condition, it provides a first warning signal S3 to a discrimination circuit 8.

The inclination detecting means 7 detects a tilt angle of a body of an electric vehicle. When the body inclines over a preset inclination angle, the inclination detecting means provides a second warning signal S4 to the discrimination circuit 8.

The output terminals of both the acceleration detecting means 6 and the inclination detecting means 7 are coupled to the input terminals of a discrimination circuit means 8, respectively.

The output terminal of the discrimination circuit means 8 is coupled to a main switch driving circuit means 9 and a time delay circuit means 10 in parallel.

The discrimination circuit means 8 provides a first cut off signal S5 to the main switch driving means 9 when it receives either or both first and second warning signals S3 and S4 from the respective acceleration detecting means 6 and the inclination detecting means 7.

Simultaneously, the time delay circuit means 10 also receives the main switch cut-off signal S5 from the discrimination circuit means After receiving the main switch cut-off signal S5, the delay circuit 10 basins to count for a predetermined time period. After counting up the period, it provides a subsidiary switch drive signal S6 to an input terminal of a subsidiary switch driving means 11.

The subsidiary switch driving means 11 supplies a subsidiary switch cut off signal S7 to the respective built-in subsidiary switch means for disconnecting the serial coupling of the batteries 13A, 13B,—1Y and 13Z into a discrete unit.

The main switch means 3 can be manually driven through a main switch driving means 9 and a manual start switch means 12.

An independent battery of a low voltage (not shown) supplies an electric energy for the operation of the acceleration detecting means 6, the inclination detecting means 7, the discrimination circuit means 8, the main switch driving means 9, the time delay circuit means 10 and the subsidiary switch driving means 11, independently.

During a normal operation, all of the built-in subsidiary switch contacts 13b in the battery unit 13A to 13Z are turning on to drive the electric vehicle when the main switch means 3 is connected by turning on the manual start switch means 12.

By turning the manual start switch means 12 on, the main switch driving circuit means 9 actuates the main switch means 3. Consequently, the high voltage from the serial circuit including the battery apparatus 1 is supplied to the load driver 5 and drives the load 30.

When the car body receives an abnormal impact or a rolling power in an emergency condition, like a car crash, the acceleration detecting means 6 and the inclination detecting means 7 deliver the first and the second warning signals S3 and S4 to the discrimination circuit means 8, respectively.

When the discrimination circuit means 8 receives the first S3 and/or the second warning signal S4, it supplies a main switch drive control signal S5 to both of the main switch drive circuit 9 and the time delay circuit 10 simultaneously.

By receiving the control signal S5, the main switch drive circuit 9 turns the main switch means 3 off immediately, and cuts off the energy supply to the inventor means 4 and the load driver 4 stops.

Coincidentally, the time delay circuit 10 basins to count a time for a preset period. After counting to the preset time period, the time delay circuit means 10 delivers a second cut-off signal S6 to the respective battery units 13. By cutting off the subsidiary switch, the serial coupling of the battery units is disconnected.

FIGS. 3 and 4 show an embodiment circuit construction of the battery unit in FIG. 2.

The battery unit 13A in FIG. 3 comprises a battery element 30a and a built-in subswitch means 30b which is coupled to the battery element in serial.

The subswitch means 30b disconnects the serial circuit in the battery unit when the turning off signal S5 is supplied from the subswitch driving means 11.

In FIG. 4, the battery unit 13A comprises a battery element 40a and a transistor switch 40c as a built-in switch contact means.

When the turning off signal S5 is supplied to the base portion of the transistor switch 40c from the subsidiary switch driving means 11, the transistor switch 40c opens the circuit in the battery unit 13A. And the respective battery unit becomes into a disconnected discrete unit.

Consequently, as mentioned in the embodiment in FIG. 1, even the insulating protection cover means for the high power battery apparatus has broken and the conductive parts are exposed in an abnormal condition, the occurrence of an electric spark due to a short circuit is prevented from and an electric shock by touching to the exposed part can be reduced.

Accordingly, a high safety of the battery drive electric vehicle can be achieved.

It is also possible to use a mixed construction of a battery apparatus in which a plurality of normal battery elements and a subswitch built-in type battery units are selectively coupled.

As explained above, when the abnormal condition is recognized, the energy supply to the load driver is firstly cut off, then after upon a certain time delay, the serial coupling of the battery elements is cut off in order to avoid the dangerous electric short circuit and an electric shock.

What is claimed is:

1. A drive energy control apparatus for an electric vehicle, comprising:

an electric power source means for providing drive energy of a high voltage and a direct heavy current to a load driver of the vehicle;

a main switch means provided between the power source means and the load driver for cutting off the direct heavy current from the power source means in case of emergency of the vehicle;

an emergency detecting means for providing a first cut off signal to the main switch means by detecting abnormal acceleration or inclination of the vehicle;

the electric power source means including a plurality of battery elements and a plurality of subsidiary switch means provided between selected ones of the battery elements for coupling them in series, said subsidiary switch means being of a smaller size than said main switch means; and a delay circuit means for providing a second cut off signal to the subsidiary switch means at a predetermined time delay after the first cut off signal is provided to the main switch means.

2. A drive energy control apparatus for an electric vehicle according to claim 1, further including a main switch driver means for driving the main switch means, wherein the emergency detecting means supplies the first cut off signal both to the main switch driver means and the delay circuit means simultaneously.

3. A drive energy control apparatus for an electric vehicle according to claim 2, wherein the main switch driver means further receives a third cut off signal for driving the main switch means in a manual operation.

4. A drive energy control apparatus for an electric vehicle according to claim 1, wherein the emergency detecting means includes a discrimination circuit for providing the first cut off signal to the main switch means, an acceleration detecting circuit for providing a first warning signal to the discrimination circuit upon detecting an acceleration exceeding a preset value, and an inclination detecting circuit for supplying a second warning signal to the discrimination circuit upon detecting an inclination exceeding a predetermined value.

5. A drive energy control apparatus for an electric vehicle according to claim 1, further including a subsidiary switch driver means provided between the delay circuit means and the plurality of subsidiary switch means for driving the plurality of subsidiary switch means to cut off the coupling of the selected ones of the battery elements at the predetermined time delay.

6. A method of operating a drive energy source for a battery drive electric vehicle, the drive source including a plurality of battery elements and subsidiary switch means coupled in series between selected ones of the battery elements, and including a main switch means between the plurality of the battery elements and a load driver of the vehicle, the main switch means being of a larger size than the subsidiary switch means, said method comprising the steps of:

detecting an abnormal acceleration and/or inclination of the vehicle;

generating a first cut off signal upon the detection of the abnormal acceleration or inclination of the vehicle;

cutting off the main switch means in response to a first cut off signal; and cutting off the subsidiary switch means in response to a second cut off signal at a predetermined time delay after the first cut off signal provided to the main switch means.

7. A drive energy control apparatus for an electric vehicle, comprising:

an electric power source means for providing drive energy of a high voltage and a direct heavy current to a load driver of the vehicle;

a main switch means provided between the power source means and the load driver for cutting off the direct heavy current from the power source means in case of emergency of the vehicle;

an emergency detecting means for providing a first cut off signal to the main switch means by detecting abnormal acceleration or inclination of the vehicle;

the electric power source means including a plurality of battery elements, each battery element including a built-in subsidiary switch means, said subsidiary switch means being of a smaller size than said main switch means; and a delay circuit means for providing a second cut off signal to the subsidiary switch means at a predetermined time delay after the first cut off signal is provided to the main switch means.

8. A driver energy control apparatus for an electric vehicle according to claim 7, wherein the built-in subsidiary switch means comprises of a transistor switch.

* * * * *